United States Patent
Saito et al.

(10) Patent No.: US 12,177,377 B2
(45) Date of Patent: Dec. 24, 2024

(54) CONTROL INFORMATION MANAGEMENT DEVICE AND REMOTE CONTROL SYSTEM

(71) Applicant: Mitsubishi Electric Corporation, Tokyo (JP)

(72) Inventors: Fumio Saito, Tokyo (JP); Masashi Ashino, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 842 days.

(21) Appl. No.: 17/299,592

(22) PCT Filed: Dec. 13, 2018

(86) PCT No.: PCT/JP2018/045848
§ 371 (c)(1),
(2) Date: Dec. 15, 2021

(87) PCT Pub. No.: WO2020/121471
PCT Pub. Date: Jun. 18, 2020

(65) Prior Publication Data
US 2022/0109750 A1    Apr. 7, 2022

(51) Int. Cl.
*H04M 1/72415* (2021.01)
*H04W 4/33* (2018.01)

(52) U.S. Cl.
CPC ......... *H04M 1/72415* (2021.01); *H04W 4/33* (2018.02)

(58) Field of Classification Search
CPC .......... H04M 1/72415; H04M 11/007; H04M 11/022; H04W 4/33; G08C 2201/20;
(Continued)

(56) References Cited

U.S. PATENT DOCUMENTS

| 2004/0039813 A1* | 2/2004 | Clark | G08C 17/02 709/224 |
| 2005/0125081 A1 | 6/2005 | Ota et al. | |
| 2006/0079210 A1 | 4/2006 | Fujibayashi | |

FOREIGN PATENT DOCUMENTS

| JP | 2002291062 A | 10/2002 | |
| JP | 2005136890 A * | 5/2005 | ............ G08C 17/02 |

(Continued)

OTHER PUBLICATIONS

International Search Report (PCT/ISA/210) and Written Opinion (PCT/ISA/237) mailed on Feb. 19, 2019, by the Japan Patent Office as the International Searching Authority for International Application No. PCT/JP2018/045848.

(Continued)

*Primary Examiner* — James J Yang
(74) *Attorney, Agent, or Firm* — Buchanan Ingersoll & Rooney PC (57) ABSTRACT

An environment is provided that allows a user deemed likely to control an electronic device to preferentially control the electronic device without requiring a cumbersome preliminary operation such as assignment of a priority to each user when multiple users remotely control the electronic device, using respective control terminals. When additional control information is issued from one of the control terminals to the electronic device, whether content of the additional control information should be notified to each of the other control terminals is determined on the basis of previous control information, and the content of the additional control information is notified to each of the control terminals for which notification has been determined to be necessary.

4 Claims, 4 Drawing Sheets

(58) Field of Classification Search
CPC ............ G08C 2201/21; G08C 2201/50; G08C 2201/93; G08C 17/02
See application file for complete search history.

(56) References Cited

FOREIGN PATENT DOCUMENTS

| | | |
|---|---|---|
| JP | 2006094369 A | 4/2006 |
| JP | 2014212496 A | 11/2014 |
| JP | 2016082336 A * | 5/2016 |

OTHER PUBLICATIONS

Extended European Search Report dated Nov. 26, 2021, issued in corresponding European Patent Application No. 18943048.1, 9 pages.

* cited by examiner

|  | AIR CONDITIONER 10-1 | AIR CONDITIONER 10-2 | AIR CONDITIONER 10-3 |
|---|---|---|---|
| CONTROL TERMINAL 30-1 | ○ | × | × |
| CONTROL TERMINAL 30-2 | ○ | × | × |
| CONTROL TERMINAL 30-3 | ○ | ○ | × |
| CONTROL TERMINAL 30-4 | × | × | ○ |
| CONTROL TERMINAL 30-5 | ○ | ○ | ○ |

FIG.4

|  |  | AIR CONDITIONER 10-1 | | AIR CONDITIONER 10-2 | | AIR CONDITIONER 10-3 | |
|---|---|---|---|---|---|---|---|
|  | APPLICABLE FUNCTION | CONTROL DATE-TIME | CONTROL DETAIL | CONTROL DATE-TIME | CONTROL DETAIL | CONTROL DATE-TIME | CONTROL DETAIL |
| CONTROL TERMINAL 30-1 | AIR FLOW VOLUME | 8/30 21:00 | LOW | – | – | – | – |
| | OPERATION MODE | 5/19 8:00 | COOLING | – | – | – | – |
| | SET TEMPERATURE | 8/31 10:10 | 21°C | – | – | – | – |
| | WIND DIRECTION | 6/11 9:10 | UP | – | – | – | – |
| CONTROL TERMINAL 30-2 | AIR FLOW VOLUME | 8/30 10:20 | HIGH | – | – | – | – |
| | OPERATION MODE | – | – | – | – | – | – |
| | SET TEMPERATURE | – | – | – | – | – | – |
| | WIND DIRECTION | – | – | – | – | – | – |
| CONTROL TERMINAL 30-3 | AIR FLOW VOLUME | 8/31 8:30 | HIGH | 8/31 8:30 | HIGH | – | – |
| | OPERATION MODE | 11/21 8:30 | HEATING | 11/21 8:30 | HEATING | – | – |
| | SET TEMPERATURE | 8/21 9:30 | 27°C | 8/21 8:30 | 27°C | – | – |
| | WIND DIRECTION | 11/1 9:30 | DOWN | 12/1 9:30 | DOWN | – | – |
| CONTROL TERMINAL 30-4 | AIR FLOW VOLUME | – | – | – | – | 8/31 8:40 | HIGH |
| | OPERATION MODE | – | – | – | – | 5/31 8:40 | COOLING |
| | SET TEMPERATURE | – | – | – | – | 8/31 8:40 | 24°C |
| | WIND DIRECTION | – | – | – | – | 12/1 9:40 | SWING |
| CONTROL TERMINAL 30-5 | AIR FLOW VOLUME | 8/29 20:50 | MEDIUM | 8/30 20:50 | LOW | 8/30 20:50 | LOW |
| | OPERATION MODE | – | – | – | – | 11/21 8:50 | HEATING |
| | SET TEMPERATURE | 8/31 8:50 | 23°C | 8/21 8:50 | 23°C | 8/21 8:50 | 23°C |
| | WIND DIRECTION | – | – | – | – | – | – |

|  | AIR CONDITIONER 10-1 | AIR CONDITIONER 10-2 | AIR CONDITIONER 10-3 |
|---|---|---|---|
| CONTROL TERMINAL 30-1 | ○ | × | × |
| CONTROL TERMINAL 30-2 | ○ | × | × |
| CONTROL TERMINAL 30-3 | ○ | ○ | × |
| CONTROL TERMINAL 30-4 | × | × | ○ |
| CONTROL TERMINAL 30-5 | - | - | - |

FIG.8

CONTROL INFORMATION MANAGEMENT DEVICE AND REMOTE CONTROL SYSTEM

FIELD

The present invention relates to a control information management device for managing control information issued from each of a plurality of control terminals to an electronic device, such as an air conditioner, remotely controllable from the plurality of control terminals, and to a remote control system including such a control information management device.

BACKGROUND

A conventionally used remote control system allows multiple users to remotely control an electronic device such as an air conditioner from their control terminals such as mobile phones or smartphones. Such a remote control system typically allows details of control on the electronic device to be updated in accordance with an instruction issued later, which is a problem because multiple users, who are desirous of different controls on the electronic device, may repeatedly provide desired instructions to control the electronic device in a competitive manner. Specifically, for example, multiple users, who are desirous of setting different temperatures for a shared air conditioner, may repeatedly provide instructions for changing the temperature setting in a competitive manner.

A technique for addressing that problem is to previously assign priorities to the users such that the user of a high priority preferentially provides control instructions, thereby achieving harmonized performance of different control instructions provided by multiple users. According to a technique disclosed in Patent Literature 1, control instructions provided by a high priority user are processed preferentially, and when a low priority user provides control instructions, a control terminal of the high priority user is notified of details of the control instructed by the low priority user. The high priority user notified of the control details provided by the low priority user can check these control details. If there are no problems with reflection of the control details provided by the low priority user, the high priority user reflects such control details by, for example, canceling early control performed by the high priority user.

CITATION LIST

Patent Literature

Patent Literature 1: Japanese Patent Application Laid-open No. 2016-82336 (pp. 3-4)

SUMMARY

Technical Problem

Unfortunately, the technique for using priorities assigned to multiple users to harmonize control instructions provided by the users, as disclosed in Patent Literature 1 above, poses a problem of requiring a cumbersome operation of previously assigning an appropriate priority to each user. This problem becomes serious as the number of users increases with an increase in size of the system.

In view of the foregoing, it is an object of the present invention to eliminate a need to conduct a cumbersome preliminary operation of assigning a priority to each user when multiple users remotely control the electronic device, using their own control terminals, and provide an environment that allows a user deemed likely to control an electronic device to preferentially control the electronic device.

Solution to Problem

A control information management device according to this invention is a control information management device for managing control information issued from each of a plurality of control terminals to an electronic device remotely controllable from the plurality of control terminals. The control information management device comprising: a memory unit to store the control information for each of the control terminals; a notification necessity determination unit to, when additional control information is issued from one of the control terminals to the electronic device, determine, on a basis of the control information stored in the memory unit, whether content of the additional control information should be notified to other control terminals, for each of the other control terminals; and a notification unit to notify the content of the additional control information to a control terminal for which notification has been determined to be necessary by the notification necessity determination unit.

Advantageous Effects of Invention

According to this invention directed to managing control information issued from each of a plurality of control terminals to an electronic device remotely controllable by the control terminals, when additional control information is issued from one of the control terminals to the electronic device, whether content of the additional control information should be to each of the other control terminals can be determined on the basis of based on various types of available information without the need to conduct a cumbersome preliminary operation. The content of the additional control information can be notified to each control terminal for which the notification has been determined to be necessary. This eliminates the need to conduct a cumbersome preliminary operation of assigning a priority to each user and provides a user deemed likely to control an electronic device with an environment that allows the user to preferentially control the electronic device.

DESCRIPTION OF EMBODIMENTS

First Embodiment

Embodiments of the present invention will be described below. Note that the present embodiment gives an air conditioner (air conditioning apparatus) as an example of the remotely controlled electronic device, and a cloud server as an example of the control information management device.

Figure 1:
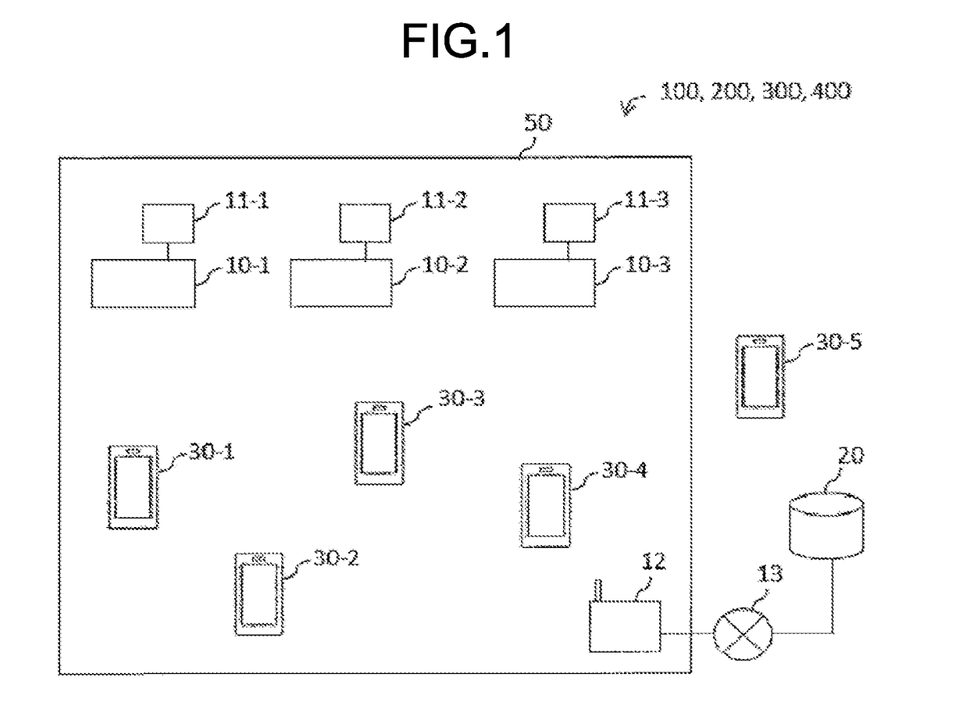
FIG. 1 is a diagram illustrating a schematic configuration of remote control systems according to first through fourth embodiments.

FIG. 1 is a diagram illustrating a schematic configuration of a remote control system 100 according to the present embodiment. As illustrated in FIG. 1, the remote control system 100 includes air conditioners 10 (10-1, 10-2, and 10-3), a cloud server 20, and control terminals 30 (30-1, 30-2, 30-3, 30-4, and 30-5). The air conditioners 10 (10-1, 10-2, and 10-3) are installed in a space 50 such as an office. The air conditioners 10 (10-1, 10-2, and 10-3), the cloud server 20, and the control terminals 30 (30-1, 30-2, 30-3, 30-4, and 30-5) are connected to one another via a wide-area communication network 13.

Each of the air conditioners 10 has remotely controllable applicable functions such as changing a set temperature, changing of an air flow volume, adjusting a wind direction, and switching between operation modes (cooling, heating, dehumidification, etc.). The air conditioner 10 is connected with a communication adapter 11 (11-1, 11-2, or 11-3) that enables the network communication. Upon receiving control information on an applicable function described above via the communication adapter 11, the air conditioner 10 operates in accordance with the received control information. For example, upon receiving control information on changing of the air flow volume via the communication adapter 11, the air conditioner 10 increases or decreases the rotational speed of the blower fan in accordance with the control information to change the air flow volume.

The communication adapter 11 is wirelessly connected to a router 12, and the router 12 is connected to the wide-area communication network 13. The wide-area communication network 13 is, for example, an Internet network, and the cloud server 20 is connected to this Internet network. This enables the cloud server 20 and the communication adapter 11 to communicate with each other via the wide-area communication network 13 and the router 12. Upon receiving the control information from the cloud server 20 via the wide-area communication network 13 and the router 12, the communication adapter 11 transfers the control information to the air conditioner 10.

Each of the control terminals 30 is a smartphone, a tablet terminal, or the like capable of remotely controlling the air conditioner 10 via the cloud server 20. The control terminal 30 is connected to the wide-area communication network 13, and can thus communicate with the cloud server 20 via that wide-area communication network 13. The control terminal 30 includes a remote control application (program) downloaded therein. This remote control application is configured to allow the control terminal 30 to receive a user input and transmit the user input to the cloud server 20. The user input provides an instruction directed to a control-target air conditioners 10. The instruction is, for example, to change the set temperature, change the air flow volume, adjust the wind direction, or switch the operation modes.

Figure 2:
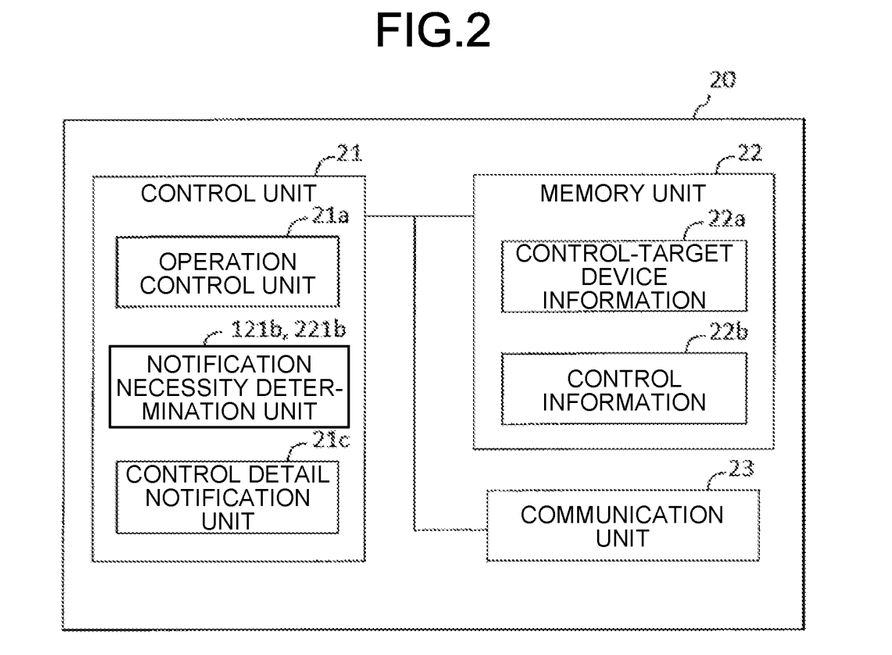
FIG. 2 is a diagram illustrating a schematic configuration of a cloud server according to the first embodiment and to the second embodiment.

The cloud server 20 is a server for managing the operation of the air conditioner 10, and relays the remote control operation which the control terminal 30 performs on the air conditioner 10. As illustrated in FIG. 2, the cloud server 20 includes a control unit 21, a memory unit 22, and a communication unit 23. The control unit 21 is implemented by a computation processing unit such as a central processing unit (CPU) to control the operation of the components in the cloud server 20. The memory unit 22 stores different types of information (data) to be used in the cloud server 20. The communication unit 23 mutually communicates with the communication adapters 11 and with the control terminals 30 via the wide-area communication network 13.

Figure 3:
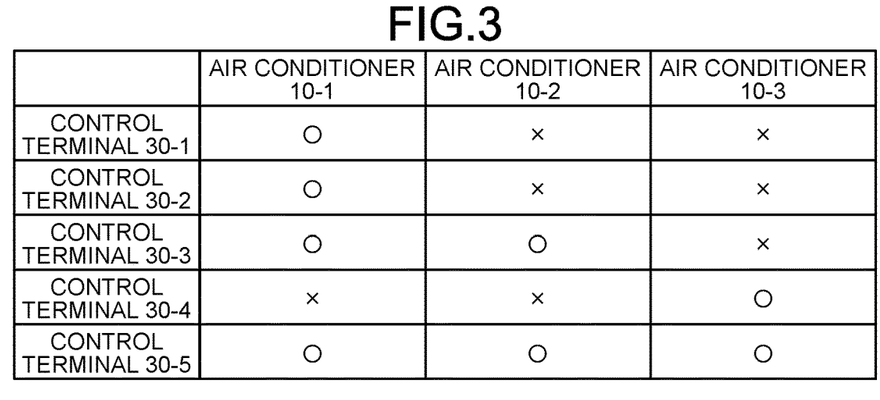
FIG. 3 is a diagram illustrating an example of controlled device information.

The memory unit 22 stores control-target information 22a and control information 22b. The control information 22b is latest information for each of the control terminals. The control-target device information 22a is information indicating correspondence relationships between each of the control terminals 30 and the air conditioner 10 controllable by that control terminal 30, as illustrated in FIG. 3. In FIG. 3, the symbol "o" means "controllable" and the symbol "x" means "uncontrollable". The example illustrated in FIG. 3 is based on the assumption that the air conditioner 10-1 is controllable by the control terminals 30-1, 30-2, 30-3, and 30-5, the air conditioner 10-2 is controllable by the control terminals 30-3 and 30-5, and the air conditioner 10-3 is controllable by the control terminals 30-4 and 30-5. Note that whether the air conditioner 10 is controllable by the control terminal 30 can be automatically or manually determined. For example, whether the air conditioner is controllable may be automatically determined in accordance with a predetermined criterion, and the determination may thereafter be changed by a user as needed.

Figure 4:
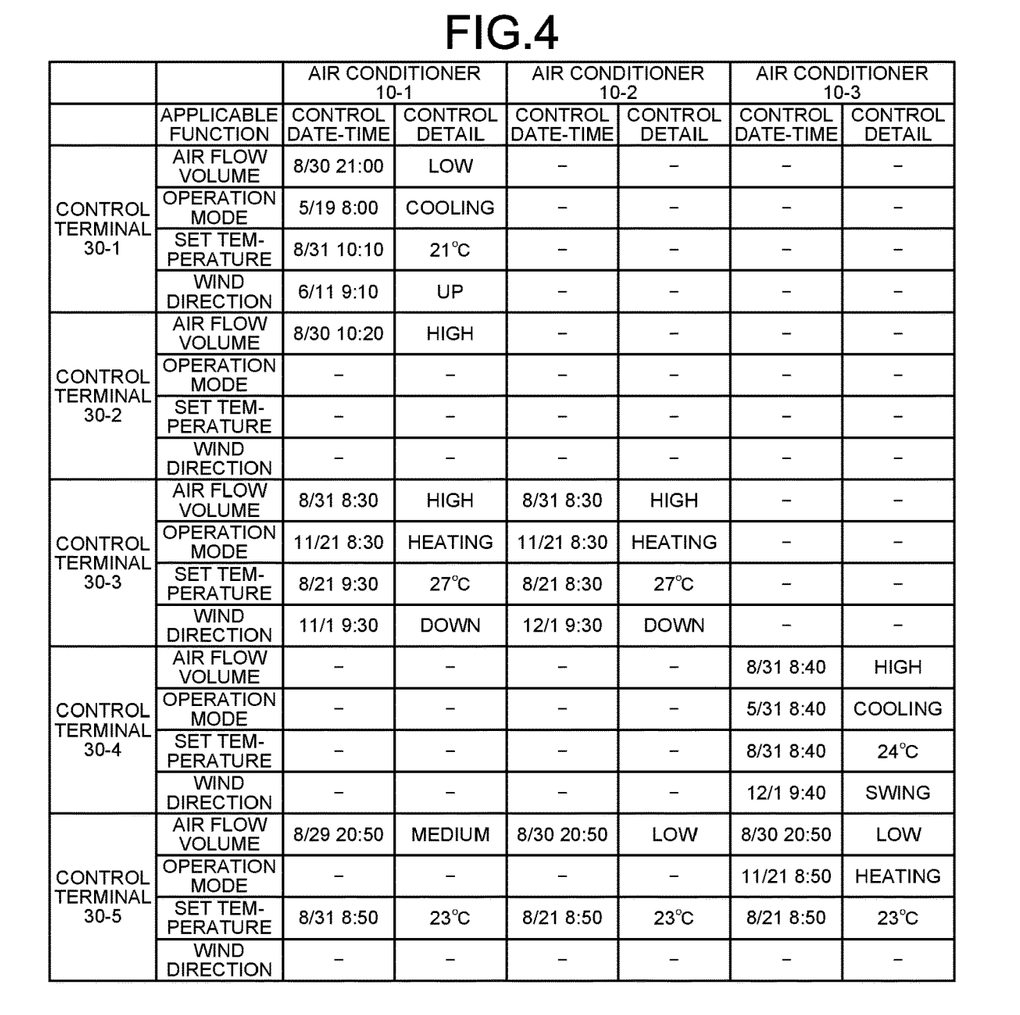
FIG. 4 is a diagram illustrating an example of control information.

The control information 22b is defined by each combination of the control terminal 30 and the air conditioners 10 controllable by that control terminal 30. The combination of the control terminal 30 and the air conditioners 10 controllable by that control terminals 30 provides information on a control date-time such applicable functions of the air conditioner as air flow volume, motion mode, set temperature, and wind direction has been controlled by the control terminal and information on its control detail, as illustrated in FIG. 4. In FIG. 4, the title "control detail" means a setting value relating to that control detail. For the combination of the control terminal 30-5 and the air conditioner 10-1 illustrated in FIG. 4, information "control date-time=August 29, 20:50" and "setting value for control detail=medium" is stored for "air flow volume". Information "control date-time=August 31, 8:50" and "setting value for control detail=23° C." is stored for "set temperature". Meanwhile, alternative information indicating that no control information exists is stored for "operation mode" and for "wind direction".

In addition, the control unit 21 described above includes an operation control unit 21a, a notification necessity determination unit 121b, and a control detail notification unit 21c. Upon receiving, from the control terminal 30, a control instruction directed to the air conditioner 10, the operation control unit 21a consults the control-target device information 22a stored in the memory unit 22, and determines whether the air conditioner 10 is controllable. If controllable, the operation control unit 21a transmits, to the communication adapter 11 connected to the control-target air conditioner 10, a control command to cause the air conditioner 10 to operate in accordance with the received control instruction. Upon receiving the control command, the communication adapter 11 transmits this control command to the air conditioner 10, such that the air conditioner 10 operates in accordance with the received control command. If the control instruction from the control terminal 30 is directed to the air conditioner 10 not controllable by that control terminal 30, the operation control unit 21a ignores this control instruction or informs the control terminal 30 having issued the control instruction that the control instruction, which was directed to the uncontrollable air conditioner, was not executed.

When control information (additional control information) is issued to the air conditioner 10 from one of the control terminals 30, the notification necessity determination unit 121*b* determines, on the basis of the control information 22*b* stored in the memory unit 22, whether content of that control information should be notified to the other control terminals 30 than the control terminal having issued that control information. Specifically, the notification necessity determination unit 121*b* determines whether the difference between the control date-time of issuance of the above control information and the latest control date-time each of the other control terminals 30 controls the corresponding air conditioner 10 falls within a predetermined time period (e.g., within 24 hours). The notification necessity determination unit 121*b* determines that the content of the control information should be notified to the control terminal(s) having the difference determined to fall within the predetermined time period.

For example, as illustrated in FIG. 4, when control information for setting "set temperature" to "21° C." was issued at "August 31, 10:10" from the control terminal 30-1 to the air conditioner 10-1, the notification necessity determination unit 121*b* first identifies the other control terminals 30-2, 30-3, and 30-5 that can control the air conditioner 10-1 than the control terminal 30-1. The notification necessity determination unit 121*b* then determines whether the difference between the latest control date-time each of the identified control terminals 30-2, 30-3, and 30-5 controls "set temperature" for the air conditioner 10-1 and the control date-time of issuance of the above control information falls within a time period of 24 hours. The notification necessity determination unit 121*b* determines that the notification is necessary only for the control terminal(s) having the difference determined to be within 24 hours. For the control terminal providing the air conditioner 10-1 with no control information stored in the memory unit 22 because, for example, that control terminal has never controlled the air conditioner 10-1, the notification necessity determination unit 121*b* determines that the notification is unnecessary for such a control terminal.

Accordingly, the notification is determined to be unnecessary for the control terminal 30-2 because of absence of control information on "set temperature" for the air conditioner 10-1. In addition, the latest control date-time the control terminal 30-3 controls "set temperature" for the air conditioner 10-1 is "August 21, 9:30", which is more than 24 hours earlier than the "control date-time (August 31, 10:10)" of issuance of the above control information. It is therefore determined that no notification is necessary for the control terminal 30-3. Meanwhile, the latest control date-time the control terminal 30-5 controls "set temperature" for the air conditioner 10-1 is "August 31, 8:50", which differs from the "control date-time (August 31, 10:10)" of issuance of the above control information by less than 24 hours. It is therefore determined that the notification is necessary for the control terminal 30-5.

When control information is issued from one of the control terminals 30 to the air conditioner 10, the notification necessity determination unit 121*b* determines the control terminal that should be notified of the content of that control information. The control detail notification unit 21*c* notifies the content of the control information (target electronic device, applicable function, control terminal, control date-time, and setting value relating to the control detail) to the control terminal for which the notification has been determined to be necessary. In the foregoing example, the control terminal 30-5, for which the notification has been determined to be necessary, is notified of information "target electronic device=air conditioner 10-1, applicable function=set temperature, control terminal=control terminal 30-1, control date-time=August 31, 10:10, and setting value relating to the control detail=21° C.". Note that in the absence of control terminals for which the notification has been determined to be necessary, no notification is provided.

Upon receiving a notification from the control detail notification unit 21*c*, the control terminal 30 notifies the user of the content of the notification by, for example, displaying the content of the received notification on a display screen of the control terminal 30. A user, who received this notification, can identify the content of the control information issued from the other control terminal 30, and, if necessary, take actions such as further controlling the electronic device or directly contacting the user that has issued the different control instruction and asking about the control operation on the electronic device. To facilitate such contact, the control terminal 30 may have a communication application (program such as a telephone application or an e-mail application) pre-installed therein, such that when the control terminal receives the notification from the control detail notification unit 21*c*, the communication application is activated to set, as a destination of the communication, a control terminal identified by control terminal information (e.g., ID information of the control terminal, and ID information, the name, or the e-mail address of the user of the control terminal) contained in the notification.

Figure 5:
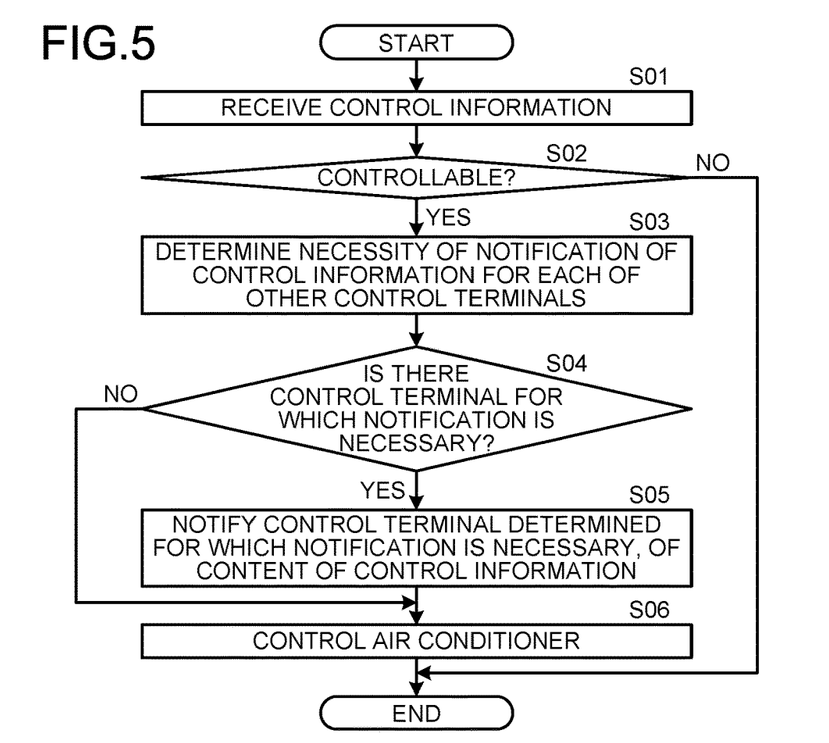
FIG. 5 is a flowchart illustrating a flow of process performed by the cloud server.

An operation of the cloud server 20 will next be described with reference to the flowchart of FIG. 5. First, when a control terminal 30-*i* (where i is an integer from 1 to 5) issues control information (additional control information) directed to an air conditioner 10-*k* (where k is an integer from 1 to 3) and the cloud server 20 receives this control information (S01), the operation control unit 21*a* consults the control-target device information 22*a* stored in the memory unit 22, and determines whether the air conditioner 10-*k* is controllable by the control terminal 30-*i* (S02). If the air conditioner 10-*k* is determined to be uncontrollable, the process terminates at this point. Alternatively, if the air conditioner 10-*k* is determined to be controllable, the received control information 22*b* is stored in the memory unit 22, and the process proceeds to the operations of step S03 and its subsequent steps. Note that the operation of step S02 is based on the assumption that the cloud server 20 receives, from a control terminal 30-*i*, control information directed to an air conditioner 10-*k* not controllable by that control terminal 30-*i*. Step 302 is unnecessary and thus may be omitted if the cloud server 20 receives only control information directed to the controllable air conditioner 10-*k*.

Next, on the basis of the control information 22*b* stored in the memory unit 22, the notification necessity determination unit 121*b* determines whether the content of the control information received at step S01 should be notified to each of the other control terminals 30-*j* (where j is an integer from 1 to 5 except i) (S03). Specifically, the notification necessity determination unit 121*b* determines whether the difference between the control date-time of issuance of the control information from the control terminal 30-*i* and the latest control date-time each of the control terminals 30-*j* controls an applicable function of the air conditioner 10-*k* falls within a predetermined time period (e.g., within 24 hours). Then, the notification necessity determination unit 121*b* determines that the content of the additional control information should be notified to the control terminal having the difference determined to fall within the predetermined time period. Since no notification is necessary for a control terminal that is unable to control the applicable air conditioner 10-*k*, such control terminal is excluded from determination.

Next, the control detail notification unit 21*c* determines whether there are control terminals for which the notification has been determined to be necessary (S04). If there are any control terminals for which the notification is necessary, the control detail notification unit 21*c* notifies the content of the control information received at step S01 to each of the control terminals for which the notification has been determined to be necessary (S05). Alternatively, if there are no control terminals for which the notification is necessary, the process proceeds to the operations of step S06 and its subsequent steps without performing this step S05.

Next, the operation control unit 21*a* transmits, to the communication adapter 11-*k* connected to the air conditioner 10-*k*, a control command for operating the air conditioner 10-*k* in accordance with the content of the control information received at step S01 (S06), and then the process terminates. Upon receiving the control command, the communication adapter 11-*k* transmits this control command to the air conditioner 10-*k*, such that the air conditioner 10-*k* operates in accordance with the received control command.

A user having issued a control instruction to an electronic device such as the air conditioner 10 is typically likely to expect that the electronic device keeps its operation following the control information thereon for a certain time period or longer. When another user thereafter issues a different control instruction to change the operation of the electronic device, the user is likely to confirm the changed content, and as the case may be, take actions such as further controlling the electronic device or directly communicating with the other user who has issued the different control instruction and asking about the control operation on the electronic device. In the present embodiment, when control information is issued from one of the control terminals to an electronic device, a user of another control terminal, which issued control information on the same applicable function of the same electronic device within a predetermined time period before the issuance of the control information from that one control terminal, is deemed likely to control the electronic device, and the control information is then notified to the control terminal of that user. The user having received this notification can obtain information regarding control of the electronic device more quickly and easily than a user not having received the notification, and preferentially control the electronic device. A user of a control terminal providing no record of control information, or, if any, providing the control date-time a predetermined time period before or earlier is deemed less likely to control the electronic device. Such a user is excluded from notification and thus does not experience inconvenience of receiving unnecessary notification.

As described above, according to the present embodiment, when control information is issued from one control terminals 30-*i* to the air conditioner 10, whether the content of the above control information should be notified to each of the other control terminals 30-*j* is determined on the basis of the control information, in particular, the control date-time. Then, the content of the additional control information is notified to the control terminal for which the notification has been determined to be necessary. This eliminates the need to conduct a cumbersome preliminary operation of assigning a priority to each user, and provides a user deemed likely to control the air conditioner 10 with an environment that allows the user to preferentially control the air conditioner 10.

In addition, the technique described in Patent Literature 1 above notifies a high priority user of control information from a low priority user, but a low priority user is not notified of control information from a high priority user or from a user assigned a similar or the same priority. As a result, in some case, a user who has controlled earlier is not aware that the control is updated thereafter. In such a case, for example, when the set temperature of the air conditioner is updated, the environment is changed to a cold or hot environment while the user who has controlled earlier does not know the update. This may make a low priority user unpleasant. In contrast, according to the present embodiment, when control is updated, a user who performed control earlier is notified of the update if the control is updated within a predetermined time period from the earlier performed control. This can reduce unpleasant feeling of the user who performed the control earlier.

Note that in the present embodiment, "predetermined time period" for use in the determination by the notification necessity determination unit 121*b* can be set to a time period such as several hours, one day, one week, or one month as appropriate depending on the control-target electronic device, the applicable function, or the like. Assume that the electronic device is, for example, an air conditioner. In this case, the predetermined time period for the set temperature which has a relatively large impact on user's comfort may be set to one week or one month. The predetermined time period for the air flow volume and the wind direction which have a relatively small impact on user's comfort may be set to one day.

In the present embodiment, when control information to control one of the applicable functions (e.g., set temperature) is issued from one of the control terminals 30 to the air conditioner 10, the notification necessity determination unit 121*b* determines whether the difference between the latest control date-time each of the other control terminals 30 controls the same applicable function of the same air conditioner 10 and the control date-time of issuance of the above control information falls within a predetermined time period. The notification necessity determination unit 121*b* determines that the content of the control information should be notified to other control terminal having the difference determined to fall within the predetermined time period. Alternatively, the notification necessity determination unit 121*b* may determine whether the difference between the control date-time of the latest one of controls performed on plural remotely-controllable applicable functions (e.g., air flow volume, operation mode, etc. in addition to set temperature) of the same air conditioner 10, and the control date-time of issuance of the above control information falls within a predetermined time period. The notification necessity determination unit 121*b* may then determine that the content of the control information should be notified to other control terminal(s) having the difference determined to fall within the predetermined time period. A user, who is considered to be probably using the target device because the user issues control information on one of the applicable functions of the electronic device, can be notified of a content of control performed thereafter on one of the applicable functions that may affect the feeling of use of the target device (e.g., comfort in the case of air conditioner), regardless of applicable function on which the user has issued the control information.

Furthermore, in the present embodiment, the notification necessity determination unit 121b and the control detail notification unit 21c may operate only during a particular time period when a user is likely to perform control on an electronic device. Such a particular time period is, for example, only weekdays, only Mondays, only holidays, or only commute hours from 8:30 to 17:00.

In addition, although the present embodiment gives an example in which the communication adapters are externally installed, the air conditioners 10 may each be configured to incorporate therein a portion that functions as the communication adapter.

Second Embodiment

A remote control system 200 according to a second embodiment will now be described with reference to FIGS. 1 through 4. Note that components similar to the corresponding components of the remote control system 100 according to the first embodiment are designated by like reference characters, and duplicate description thereof will be omitted. The present embodiment differs from the first embodiment in the process performed by a notification necessity determination unit 221b.

When control information (additional control information) is issued from one of the control terminals 30 to the air conditioner 10, the notification necessity determination unit 221b determines, on the basis of the control information 22b stored in the memory unit 22, whether the content of that control information should be notified to the other control terminals 30 than the control terminal having issued that control information. Specifically, regarding the applicable function (air flow volume, operation mode, set temperature, or wind direction) controlled by the above control information, the notification necessity determination unit 221b determines whether a difference between the setting value relating to a detail of the latest control performed by each of the other control terminals 30 on the air conditioner 10 and the setting value relating to the control detail included in the above control information exceeds a predetermined threshold. The notification necessity determination unit 221b determines that the content of the control information should be notified to the control terminal having the difference determined to exceed the threshold.

For example, assume that "set temperature", which is one of the applicable functions, has a predetermined threshold of 4° C., and that as illustrated in FIG. 4, control information for setting "set temperature" to "21° C." was issued at "August 31, 10:10" from the control terminal 30-1 to the air conditioner 10-1. In this case, the notification necessity determination unit 121b first identifies the control terminals 30-2, 30-3, and 30-5 that can control the air conditioner 10-1 other than the control terminal 30-1. The notification necessity determination unit 221b determines whether the difference between the setting value relating to a detail of the latest control performed by each of the identified control terminals 30-2, 30-3, and 30-5 on "set temperature" for the air conditioner 10-1 and the setting value relating to the control detail included in the above control information exceeds 4° C. The notification necessity determination unit 221b determines that notification is necessary for the control terminal(s) having the difference determined to exceed 4° C. For the control terminal providing the air conditioner 10-1 with no control information stored in the memory unit 22 because, for example, that control terminal has never controlled the air conditioner 10-1, the notification necessity determination unit 221b determines that notification is unnecessary for such a control terminal.

Accordingly, the notification is determined to be unnecessary for the control terminal 30-2 because of absence of control information on "set temperature" for the air conditioner 10-1. In addition, the setting value relating to a detail of the latest control performed by the control terminal 30-3 on "set temperature" for the air conditioner 10-1 is "27° C.". A difference between the setting value of "27° C." and the setting value "21° C." relating to the detail of control on "set temperature" for the air conditioner 10-1 exceeds 4° C. It is therefore determined that the notification is necessary for the control terminal 30-3. Meanwhile, the setting value relating to a detail of the latest control performed by the control terminal 30-5 on "set temperature" for the air conditioner 10-1 is "23° C.". A difference between the setting value of "23° C." and the setting value "21° C." relating to the detail of the control on "set temperature" for the air conditioner 10-1 does not exceed 4° C. It is therefore determined that no notification is necessary for the control terminal 30-5.

In a case in which the applicable function is "air flow volume" having three levels, i.e., low, medium, and high that can be set, the predetermined threshold can be "one level". In this case, for example, when the difference between setting values relating to the control detail is one level, i.e., "low-medium" or "medium-high", notification is determined to be unnecessary, whereas when the difference is two levels, i.e., "low-high", notification is determined to be necessary.

In a case in which the applicable function is "operation mode" such as cooling and heating that can be set, the preset threshold can be "none (which means no difference)". In this case, for example, when the setting of the operation mode is not changed, notification is determined to be unnecessary, whereas when the setting of the operation mode is changed, notification is determined to be necessary. Furthermore, in a case in which the applicable function is "wind direction" such as upward direction and downward direction that can be set, the preset threshold can be "none (which means no difference)". In this case, for example, when the setting of the wind direction is not changed, notification is determined to be unnecessary, whereas when the setting of the wind direction is changed, notification is determined to be necessary.

A user having issued a control instruction to an electronic device such as the air conditioner 10 is typically likely to expect that the electronic device keeps operating within a desired range, and, when another user thereafter issues a different control instruction to allow the electronic device to operate beyond the desired range, is likely to confirm the changed content, and as the case may be, to take actions such as further controlling the electronic device, or directly communicating with the user that has issued the different control instruction and asking about the control operation on the electronic device. Thus, in the present embodiment, when control information is issued to an electronic device from one of the control terminals, the user of another control terminal having issued control information on a setting value relating to a control detail that differs from the setting value relating to the control detail included in the control information from the one control terminals by more than a predetermined threshold is deemed likely to control the electronic device, and is notified of the control information. The user having received this notification can obtain information regarding control on the electronic device more quickly and easily than a user not having received the notification, and preferentially control the electronic device.

A user of a control terminal providing no record of control information, or, if any, providing a control-detail-related setting value not exceeding a predetermined threshold is deemed less likely to control the electronic device. Such a user is excluded from notification and does not experience inconvenience of receiving unnecessary notification.

As described above, according to the present embodiment, when control information is issued from one control terminals 30-*i* to the air conditioner 10, whether the content of the above control information should be notified to each of the other control terminals 30-*j* is determined on the basis of the control information, in particular, the setting value relating to the control detail. Then, the content of the additional control information is notified to the control terminal(s) for which the notification has been determined to be necessary. This eliminates the need to conduct a cumbersome preliminary operation of assigning a priority to each user, and provides a user deemed likely to control the air conditioner 10 with an environment that allows the user to preferentially control the air conditioner 10.

Third Embodiment

Figure 6:
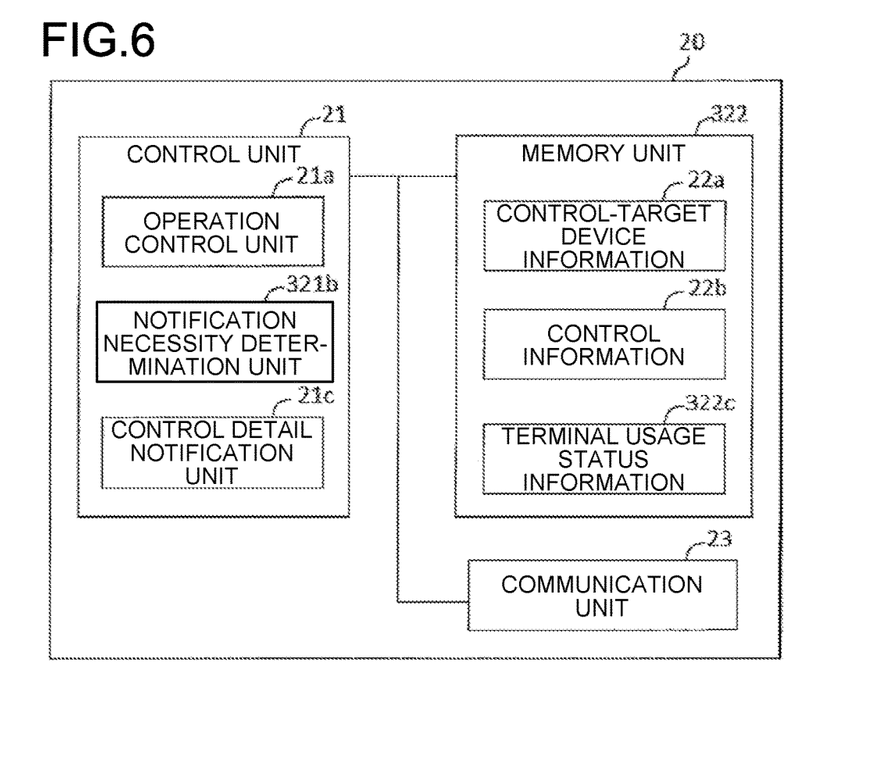
FIG. 6 is a diagram illustrating a schematic configuration of the cloud server according to the third embodiment.

A remote control system 300 according to a third embodiment will now be described with reference to FIGS. 1, 3, and 6. Note that components similar to the corresponding components of the remote control system 100 according to the first embodiment are designated by like reference characters, and duplicate description thereof will be omitted. The present embodiment differs from the first embodiment in the processes performed by a memory unit 322 and by a notification necessity determination unit 321*b*.

The memory unit 322 stores terminal usage status information 322*c* in addition to the control-target device information 22*a* and the control information 22*b*. The terminal usage status information 322*c* is information on the usage status of the control terminal 30 used by the user. This terminal usage status information 322*c* may be, for example, location information (e.g., GPS information etc.) of the control terminals 30, information indicating whether a user is in a logged-in state with respect to the control terminal 30 (hereinafter referred to as "login information"), or information indicating whether a remote control application pre-installed in the control terminal 30 is in an active state (hereinafter referred to as "remote control application activity information"). This terminal usage status information 322*c* is obtained from each of the control terminals 30 and is stored in the memory unit 322 periodically and/or at a time before each determination process by the notification necessity determination unit 321*b*.

When control information (additional control information) is issued from one of the control terminals 30 to the air conditioner 10, the notification necessity determination unit 321*b* determines, on the basis of the terminal usage status information 322*c* stored in the memory unit 322, whether the content of that control information should be notified to the other control terminals 30 than the control terminal having issued that control information. Specifically, in a case in which the location information on the control terminals 30 has been obtained as the terminal usage status information 322*c*, and stored in the memory unit 322, the notification necessity determination unit 321*b* determines whether the user can use the air conditioner 10 at a location identified by the location information stored in the memory unit 322 for each of the other control terminals 30 than the control terminal having issued the above control information. The notification necessity determination unit 321*b* determines that the content of the control information should be notified to the control terminal the user of which has been determined to be able to use the air conditioner 10. Since no notification is necessary for a control terminal incapable of controlling the target air conditioner 10, such control terminal is excluded from determination. When the terminal usage status information 322*c* is not obtainable from the control terminal 30 for some reason such as disconnection of the communication between the cloud server 20 and that control terminal 30, such a control terminal 30 is deemed incapable of controlling the applicable air conditioner 10, and thus excluded from determination.

For example, assume that the user can use the air conditioner 10-1 only in the space 50, and that as illustrated in FIG. 1, the control terminals 30-1, 30-2, 30-3, and 30-4 are located in the space 50, whereas the control terminal 30-5 is located outside the space 50. In such a case, when control information is issued from the control terminal 30-1 to the air conditioner 10-1, the notification necessity determination unit 321*b* first determines whether the user can use the air conditioner 10-1 at the location identified by the location information on each of the other control terminals 30-2, 30-3, 30-4, and 30-5. That is, the notification necessity determination unit 321*b* determines whether each of the control terminals is located in the space 50. As a result, the control terminals 30-2, 30-3, and 30-4 located in the space 50 are determined to be the control terminals whose user can use the air conditioner 10-1. In addition, the control terminal 30-4 incapable of controlling the air conditioner 10-1 is excluded from these determined control terminals (see FIG. 3), and it is finally determined that the control terminals 30-2 and 30-3 should be notified.

It is thought that a user at a location where the electronic device such as the air conditioner 10 can be used is typically more likely to control the electronic device than a user at a location where the electronic device such as the air conditioner 10 cannot be used. Thus, in the present embodiment, the location of a control terminal is deemed the same as the location of the user thereof, and a user who can use the electronic device at the location of that control terminal is deemed likely to control the electronic device, and is notified of control information. The user having received this notification can obtain information regarding control on the electronic device more quickly and easily than a user not having received the notification, and preferentially control the electronic device. In addition, in a case in which the user cannot use the electronic device at the location of the control terminal, the user is deemed less likely to control the electronic device. Such a user is excluded from notification and thus does not experience inconvenience of receiving unnecessary notification.

Note that the above description is made as to an example in which location information on the control terminal 30 is used as the terminal usage status information 322*c*, but the terminal usage status information 322*c* may include login information on the user with respect to the control terminal 30, or remote control application activity information with respect to the control terminal 30. Each of such cases will be described below.

A description will first be made as to a case in which the terminal usage status information 322*c* is login information on the user with respect to the control terminal 30. In this case, when control information (additional control information) is issued from one of the control terminals 30 to the air conditioner 10, the notification necessity determination unit 321*b* determines whether the user is in a logged-in state, using information stored in the memory unit 322 for each of the other control terminals 30 than the control terminal having issued the foregoing control information. The notification necessity determination unit 321b determines that the content of the control information should be notified to the control terminal the user of which has been determined to be in a logged-in state. Since no notification is necessary for a control terminal incapable of controlling the target air conditioner 10, such a control terminal is excluded from determination. When the terminal usage status information 322c is not obtainable from the control terminal 30 for some reason such as disconnection of the communication between the cloud server 20 and that control terminal 30, such a control terminal 30 is deemed incapable of controlling the applicable air conditioner 10, and thus excluded from determination.

When a user tries to remotely control an electronic device such as the air conditioner 10, using the control terminal 30, the user is typically often required to be in a logged-in state with respect to the control terminal 30. Thus, in the example described above, a user in a logged-in state with respect to the control terminal 30 is deemed more likely to control the electronic device than not in a logged-in state with respect to the control terminal 30. Thus, control information is notified to the control terminal whose user is in a logged-in state. The user having received this notification can obtain information regarding control on the electronic device more quickly and easily than a user not having received the notification, and preferentially control the electronic device. In addition, when the user is not in a logged-in state with respect to the control terminal 30, the user is deemed less likely to control the electronic device. Such a user is thus excluded from notification and does not experience inconvenience of receiving unnecessary notification.

A description will next be made as to a case in which the terminal usage status information 322c is remote control application activity information with respect to the control terminal 30. In this case, when control information (additional control information) is issued from one of the control terminals 30 to the air conditioner 10, the notification necessity determination unit 321b determines whether the remote control application is in an active state, using information stored in the memory unit 322 for each of the other control terminals 30 than the control terminal having issued the foregoing control information. The notification necessity determination unit 321b determines that the content of the control information should be notified to the control terminal having the remote control application determined to be in an active state. Since no notification is necessary for a control terminal incapable of controlling the applicable air conditioner 10, such a control terminal is excluded from determination. When the terminal usage status information 322c is not obtainable from the control terminal 30 for some reason such as disconnection of the communication between the cloud server 20 and that control terminal 30, such a control terminal 30 is deemed incapable of controlling the applicable air conditioner 10, and is thus excluded from determination.

When a user tries to remotely control an electronic device, such as the air conditioner 10, using the control terminal 30, it is typically often required that the remote control application pre-installed in the corresponding control terminal 30 be in an active state. Thus, in the example described above, the electronic device is deemed more likely to be controlled when the remote control application is in an active state than when the remote control application is not in an active state. Thus, control information is notified to the control terminal whose remote control application is in an active state. The user having received this notification can obtain information regarding control on the electronic device more quickly and easily than a user not having received the notification, and preferentially control the electronic device. In addition, when the remote control application of the control terminal is not in an active state, the user of that control terminal is deemed less likely to control the electronic device. Such a user is thus excluded from notification and does not experience inconvenience of receiving unnecessary notification.

As described above, according to the present embodiment, when control information is issued from one control terminals 30-*i* to the air conditioner 10, whether the content of the above control information should be notified to each of the other control terminals 30-*j* is determined on the basis of the terminal usage status information. Then, the content of the additional control information is notified to the control terminal for which the notification has been determined to be necessary. This eliminates the need to conduct a cumbersome preliminary operation of assigning a priority to each user, and provides a user deemed likely to control the air conditioner 10 with an environment that allows the user to preferentially control the air conditioner 10.

In the present embodiment, a description is made as to a case in which the notification necessity determination unit 321b determines whether the notification is necessary, directly from the terminal usage status information 322c stored in the memory unit 322. Alternatively, whether the user of each of the control terminals 30 is using the applicable air conditioner may be first determined using the terminal usage status information 322c, and then whether the notification is necessary may be determined using the result of the determination. Specifically, in a case in which the terminal usage status information 322c is location information on the control terminals 30, it is determined whether the user can use the applicable air conditioner 10 at the location identified by that location information. Then, if it is determined that the user can use the applicable air conditioner 10, the user is determined to be using the applicable air conditioner. If it is determined that the user cannot use the applicable air conditioner 10, the user is determined to be not using the applicable air conditioner.

Figure 7:
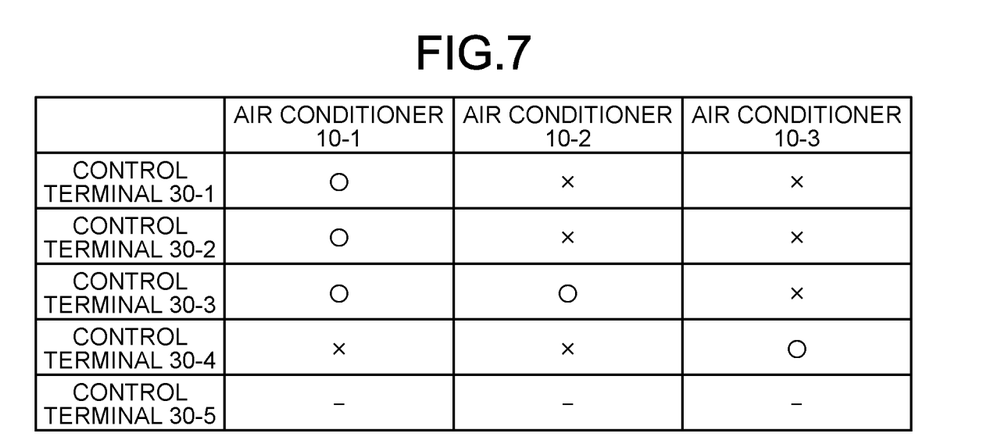
FIG. 7 is a diagram illustrating an example of device use information.

The above determination process can generate device use information as illustrated in FIG. 7. In FIG. 7, the symbol "o" means "using", the symbol "-" means "not using", and the symbol "x" means "uncontrollable". The notification necessity determination unit 321b then consults the device use information as illustrated in FIG. 7 to determine that the content of the control information should be notified to the control terminal(s) whose user is using the applicable air conditioner.

In a case in which the terminal usage status information 322c is login information on the users with respect to the control terminal 30, whether the user is in a logged-in state is determined. When the user is in a logged-in state, the user is determined to be using the applicable air conditioner. When the user is not in a logged-in state, the user is determined to be not using the applicable air conditioner. In a case in which the terminal usage status information 322c is remote control application activity information on the control terminals 30, whether the remote control application is in an active state is determined. When the remote control application is in an active state, the user is determined to be using the applicable air conditioner. When the remote control application is not in an active state, the user is determined to be not using the applicable air conditioner.

Fourth Embodiment

A remote control system 400 according to a fourth embodiment will now be described with reference to FIGS.

Figure 8:
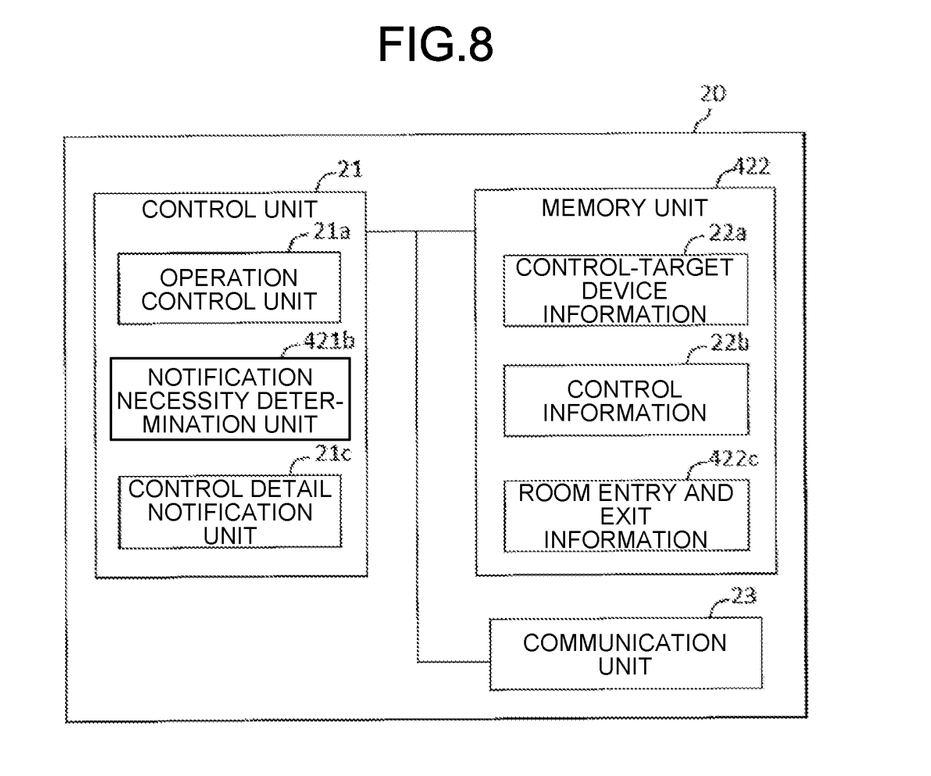
FIG. 8 is a diagram illustrating a schematic configuration of the cloud server according to the fourth embodiment.

1 and 8. Note that components similar to the corresponding components of the remote control system 100 according to the first embodiment are designated by like reference characters, and duplicate description thereof will be omitted. The present embodiment differs from the first embodiment in the processes performed by a memory unit 422 and by a notification necessity determination unit 421b.

The memory unit 422 stores room entry and exit information 422c in addition to the control-target device information 22a and the control information 22b. The room entry and exit information 422c is information indicating whether the user of each of the control terminals is in an in-room state indicating that the user is in the space 50 (room) where the air conditioner 10 is installed. This room entry and exit information 422c is obtained from a room entry and exit management system (not illustrated) and is stored in the memory unit 422 periodically and/or at a time before each determination process performed by the notification necessity determination unit 421b.

When control information (additional control information) is issued from one of the control terminals 30 to the air conditioner 10, the notification necessity determination unit 421b determines, on the basis of the room entry and exit information 422c stored in the memory unit 422, whether the content of that control information should be notified to the other control terminals 30 than the control terminal having issued that control information. Specifically, the notification necessity determination unit 421b determines whether the user is in an in-room state, using the room entry and exit information 422c stored in the memory unit 422 for each of the other control terminals 30 than the control terminal having issued the above control information. The notification necessity determination unit 421b determines that the content of the control information should be notified to the control terminal the user of which has been determined to be in an in-room state. Since no notification is necessary for a control terminal incapable of controlling the applicable air conditioner 10, such a control terminal is excluded from determination.

It is thought that a user in an in-room state, who is in the room where the electronic device such as the air conditioner 10 is installed, is typically more likely to control the electronic device than a user in an out-of-room state. Thus, in the present embodiment, a user in an in-room state, who is in the space 50 where the air conditioner 10 is installed, is deemed likely to control the electronic device, and control information is then notified to the control terminal of that user. The user having received this notification can obtain information regarding control on the electronic device more quickly and easily than a user not having received the notification, and preferentially control the electronic device. In addition, when the user is in an out-of-room state, the user is deemed less likely to control the electronic device. Such a user is excluded from notification and thus does not experience inconvenience of receiving unnecessary notification.

As described above, according to the present embodiment, when control information is issued from one control terminals 30-i to the air conditioner 10, whether the content of the foregoing control information should be notified to each of the other control terminals 30-j is determined on the basis of the room entry and exit information on the user. Then, the content of the additional control information is notified to the control terminal for which the notification has been determined to be necessary. This eliminates the need to conduct a cumbersome preliminary operation of assigning a priority to each user, and provides a user deemed likely to control the air conditioner 10 with an environment that allows the user to preferentially control the air conditioner 10.

Note that in the present embodiment, a description is made as to a case in which the notification necessity determination unit 421b determines whether the notification is necessary, directly from the room entry and exit information 422c stored in the memory unit 422. Alternatively, whether the user of each of the control terminals 30 is using the applicable air conditioner may first determined using the room entry and exit information 422c, and then whether the notification is necessary may be determined using the result of the determination. Specifically, whether the user is in an in-room state is determined using the room entry and exit information 422c stored in the memory unit 422. Then, the user is determined to be using the applicable air conditioner when the user is in an in-room state. The user is determined to be not using the applicable air conditioner when the user is in an out-of-room state.

The above determination process can generate device use information as illustrated in FIG. 7. In FIG. 7, the symbol "o" means "using", the symbol "-" means "not using", and the symbol "x" means "uncontrollable". The notification necessity determination unit 421b then consults the device use information as illustrated in FIG. 7 to determine that the content of the control information should be notified to the control terminal whose user is using the applicable air conditioner.

Note that each of the above embodiments may be provided by combining two or more of the embodiments as appropriate. That is, a control terminal for which notification is determined to be necessary in each of the combined embodiments is finally determined to be a control terminal for which notification is necessary, and that control terminal determined is notified. For example, in a case where a combination of the first embodiment and the second embodiment is provided, it is determined that the notification should be provided to the control terminal having a difference in the control date-time within a predetermined time period and a difference in the control-detail-related setting value exceeding a predetermined threshold.

In addition, in each of the above embodiments, a description is made as to a case in which a control terminal for which notification is necessary is automatically determined on the basis of information such as the control information, the terminal usage status information, or the room entry and exit information, and the notification is provided to the determined control terminal. Alternatively, users may individually set in what case the user desires to receive the notification, and whether the notification is necessary is determined taking that setting into consideration. For example, users may individually set his desire to be always notified of all items of the control information (or all items of the control information on some particular applicable function(s)) on a target electronic device. Alternatively, the users may individually set his desire to be notified of none of all items of the control information (or all items of the control information on some particular applicable function (s)) on a target electronic device. Alternatively, the users may individually set his desire to receive the notification only when a setting value relating to the detail of control performed on a target electronic device with respect to a particular applicable function satisfies a certain condition.

In each of the above embodiments, a description is made as to, by way of example, a case in which the control information management device and the remote control system of the present invention is used when an air conditioner is remotely controlled from plural control terminals. Alternatively, the control information management device and the remote control system of the present invention is used when various other electronic devices such as lighting equipment are remotely controlled from plural control terminals.

In the above third and fourth embodiments, descriptions are made as to cases in which device use information is generated on the basis of the terminal usage status information $322c$, the room entry and exit information $422c$, or the like. Alternatively, the device use information may also be generated on the basis of information other than these items of information. For example, when the usage status of an electronic device used by a user is determinable on the basis of an image captured by a surveillance camera, the device use information may be generated on the basis of such image information. It is thought that a user using an electronic device is typically more likely to control the electronic device than a user not using that electronic device. The user deemed likely to control the electronic device can be provided with an environment that allows the user to preferentially control the electronic device because a control terminal having information that the usage status of the electronic device indicates that the electronic device is in use receives the notification.

REFERENCE SIGNS LIST 10 air conditioner (electronic device); 11 communication adapter; 12 router; 13 wide-area communication network; 20 cloud server (control information management device); 21 control unit; 21a operation control unit; 121b, 221b, 321b, 421b notification necessity determination unit; 21c control detail notification unit; 22, 322, 422 memory unit; 22a controlled device information; 22b control information; 23 communication unit; 30 control terminal; 50 space; 100, 200, 300, 400 remote control system; 322c terminal usage status information; 422c room entry and exit information.

The invention claimed is:

1. A control information management device for managing control information issued from each of a plurality of control terminals to an electronic device remotely controllable from the plurality of control terminals, the control information management device comprising:

memory circuitry to store the control information for each of the control terminals;

notification necessity determination circuitry to, when additional control information is issued from one of the control terminals to the electronic device, determine, on a basis of the control information stored in the memory circuitry, whether content of the additional control information should be notified to other control terminals, for each of the other control terminals; and notification circuitry to notify the content of the additional control information to a control terminal for which notification has been determined to be necessary by the notification necessity determination circuitry, wherein the control information includes a control date-time and a setting value relating to a control detail of each of remotely controllable applicable functions of the electronic device, and when the additional control information is issued from one of the control terminals to the electronic device, the notification necessity determination circuitry determines, for each of the other control terminals, whether a difference between a latest control date-time stored in the memory circuitry and a control date-time included in the additional control information falls within a predetermined time period, and the notification necessity determination circuitry determines whether a difference exceeds a predetermined threshold, the difference being a difference between a setting value relating to a latest control detail stored in the memory circuitry and a setting value relating to a control detail included in the additional control information with respect to an applicable function controlled by the additional control information, and the notification necessity determination circuitry determines that the content of the additional control information should be notified to a control terminal having the difference in the control date-time determined to fall within the predetermined time period and having the difference in the setting value relating to the control detail determined to exceed the predetermined threshold.

2. The control information management device according to claim 1, wherein in a case in which the electronic device has a plurality of applicable functions that are remotely controllable, the memory circuitry stores the control information for each of the applicable functions, and when additional control information to control one of the applicable functions is issued from one of the control terminals to the electronic device, the notification necessity determination circuitry determines, on the basis of the control information on the controlled applicable function stored in the memory circuitry, whether content of the additional control information should be notified for each of the other control terminals.

3. A remote control system comprising:

the electronic device;

the plurality of control terminals; and the control information management device according to claim 1.

4. The remote control system according to claim 3, wherein the notification circuitry notifies each of the control terminals for which the notification has been determined to be necessary, of identification information on the control terminal that has issued the additional control information in addition to the content of the additional control information, and each of the control terminals comprises control circuitry to activate a program for communication pre-installed in that control terminal when the control terminal receives the notification, and to set the control terminal identified by the identification information contained in the notification, as a destination of communication.

* * * * *